United States Patent [19]

Cooper et al.

[11] 4,106,948

[45] Aug. 15, 1978

[54] AQUEOUS COMPOSITIONS

[75] Inventors: Bryan Ewart Cooper; Paul Lance Millard, both of South Glamorgan, Wales

[73] Assignee: Dow Corning Limited, Barry, Wales

[21] Appl. No.: 800,241

[22] Filed: May 25, 1977

[30] Foreign Application Priority Data

Jun. 8, 1976 [GB] United Kingdom ............... 23558/76

[51] Int. Cl.² .................................................. C08L 1/28
[52] U.S. Cl. .............................. 106/197 R; 260/17 R; 106/287.14; 106/287.15; 428/447; 428/535
[58] Field of Search ....... 106/197 R, 287 SB, 287 SE; 260/17 R; 428/447, 535; 536/88

[56] References Cited

U.S. PATENT DOCUMENTS

| | | | |
|---|---|---|---|
| 2,785,994 | 3/1957 | Lupfer | 428/447 |
| 3,769,247 | 10/1973 | Glomski et al. | 106/197 R |
| 3,976,497 | 8/1976 | Clark | 106/287 SE |

*Primary Examiner*—Theodore Morris
*Attorney, Agent, or Firm*—Robert F. Fleming, Jr.

[57] ABSTRACT

Aqueous compositions obtained by mixing together water, hydroxyethyl cellulose and an organosilicon compound $RSi(OR')_3$, wherein R represents methyl, ethyl or vinyl and each R' represents methyl, ethyl or methoxyethoxy. The compositions are useful as primers and protective coatings for surfaces, particularly wood.

6 Claims, No Drawings

AQUEOUS COMPOSITIONS

This invention relates to aqueous compositions, a process for preparing such compositions and to the use of such compositions for coating surfaces.

It is known that hydroxyalkyl derivatives of cellulose, for example hydroxyethyl cellulose, can be cast into clear films from aqueous solutions. Such films, however, have only poor resistance to water and are therefore unsuitable for applications involving exposure to moist conditions.

We have now found that aqueous compositions based on hydroxyethyl cellulose can be prepared which are capable of providing films having a significantly improved resistance to water.

According to this invention there is provided an aqueous composition comprising the product obtained by mixing together (A) water, (B) hydroxyethyl cellulose and (C) an organosilicon compound of the general formula $RSi(OR')_3$ wherein R represents a methyl, ethyl or vinyl group and R' represents a methyl, ethyl or methoxyethyl group.

Hydroxyethyl cellulose which is employed as component (B) in the preparation of aqueous compositions according to this invention is a well known and commercially available substance. It is water-soluble and may be manufactured, for example, by reacting alkali cellulose with ethylene oxide in the presence of isopropyl alcohol, t-butyl alcohol or acetone. The degree of polymerization and molar substitution (MS) of the hydroxyethyl cellulose are not critical provided it is, or can be made, soluble in water. Preferred hydroxyethyl celluloses are those having molecular weights up to about 150,000 and a molar substitution in the range from 1.3 to 2.8.

The organosilicon compounds (C) are also known substances and can be prepared by methods well-known in the art. Specific examples of the operative organosilicon compounds are methyl trimethoxysilane, methyl triethoxysilane, ethyl trimethoxysilane, vinyl trimethoxysilane and methyl tris(methoxyethoxy)silane. The preferred organosilicon compound, from considerations of cost and availability, is methyl trimethoxysilane.

Preparation of the aqueous compositions of this invention may be achieved by dissolving (B) and (C) in water. Conveniently an aqueous solution of the hydroxyethyl cellulose is prepared and to this is then added with stirring the organosilicon compound. The aqueous compositions can be prepared at ordinary ambient temperatures, that is from about 15° to about 25° C. If desired, however, they may be prepared at elevated temperatures.

The relative proportions of (A), (B) and (C) employed to form the compositions of this invention are not critical. When the compositions are intended for use as protective coating compositions or for the casting of films the proportion of water in the compositions may vary from 20 to 95% by weight. For other applications e.g. as primers even more dilute compositions, for example with up to 99% by weight of water, may be appropriate. In general the preferred compositions are those wherein the proportion of water is from 75 to 99% by weight based on the total weight of the composition. The proportion of (B) relative to (C) may also be varied within fairly wide limits depending on the type of film or coating required. Preferably there are employed from 1 to 30 parts by weight of (C) per part of (B), and most preferably from 2 to 10 parts by weight of (C) per part of (B).

As indicated above the compositions of this invention are useful for coating substrates, for example metal, plastics, glass and especially wood. They are also useful as primers for bonding silicone rubbers to such substrates and for the preparation of cast films. They may be applied to the surface to be coated using any suitable technique, for example by dipping, brushing or spraying. After application of the aqueous composition the substrate may be allowed to dry at ambient temperature, or drying may be expedited by exposure to elevated temperatures.

The compositions of this invention are stable for periods of about 48 hours and are preferably prepared just prior to use. The working life of the compositions may however be extended by adjusting the pH of the solution to a value of from 3 to 5.5. This may be achieved by incorporating into the solution a small amount of an acid, for example acetic acid. Some improvement in storage stability may also be obtained by the addition of a small proportion of an alcohol.

The following examples illustrate the invention.

EXAMPLE 1

Hydroxyethyl cellulose (WP 300L-Union Carbide) (2.5 g.) was dissolved in water (100 ml.) and methyl trimethoxysilane (6.8 ml.) added with stirring to the solution. Acetic acid was added drop by drop until the pH of the solution reached 3.5 and the solution was stirred until it became clear.

The solution thus prepared was coated on small panels of deal by brushing and the panels dried either by placing in an oven at 80° C for about 1 hour or by exposure to the ambient atmosphere (20° C) for 24 hours. When dry the coating was clear and hard with excellent adhesion to the wood surface.

Deal panels coated on one surface as described above were immersed in water at 15°–20° C for 3 months. Although the wood became completely saturated the film remained intact and with good adhesion.

For comparative purposes aqueous solutions of hydroxyethyl cellulose and of methyl trimethoxysilane were prepared and used to coat similar panels. In both cases clear films were obtained after drying; the film of hydroxyethyl cellulose however dissolved after immersion in water for 24 hours. The film of methyltrimethoxysilane started to disintegrate after 3 days immersion.

EXAMPLE 2

Deal panels were coated with an aqueous composition prepared from hydroxyethyl cellulose and methyl trimethoxysilane as described in Example 1. The panels were exposed to the ambient atmosphere for 3 days and a one component, room temperature curing silicone rubber (comprising a mixture of a hydroxylated polydiorganosiloxane and an oxime silane) then applied over the coated surfaces. When cured the silicone rubber exhibited good adhesion to the wood before and after immersion in water for 1 month.

EXAMPLE 3

An aqueous composition of hydroxyethyl cellulose and methyltrimethoxysilane was prepared as in Example 1 except that Union Carbide QP 4400 was employed in place of WP 300L. The composition was applied to the surfaces of panels of oak, deal and Douglas fir and the surfaces allowed to dry for 3 days. Layers of two types of room temperature vulcanising rubbers were applied to the dried coatings, one type comprising a mixture of a hydroxylated polydiorganosiloxane and an acetoxy silane and the other being as described in Example 2.

When cured the silicone rubber exhibited good adhesion to all of the wood surfaces before and after immersion of the panels in water at 20° C for 1 month.

That which is claimed is:

1. An aqueous composition consisting essentially of the product that has been obtained by mixing together (A) water, (B) hydroxyethyl cellulose and (C) an organosilicon compound of the general formula RSi(OR')$_3$, wherein R represents an organic group selected from methyl, ethyl and vinyl groups and R' represents an organic group selected from methyl, ethyl and methoxyethyl groups.

2. An aqueous composition as claimed in claim 1 wherein the organosilicon compound (C) is employed in a proportion of from 2 to 10 parts by weight per part by weight of (B).

3. An aqueous composition as claimed in claim 1 which has a pH in the range from 3.0 to 5.5.

4. A process for coating a surface which comprises applying thereto a coating of an aqueous composition as claimed in claim 1 and drying the applied coating.

5. A process as claimed in claim 4 wherein the organosilicon compound (C) is methyl trimethoxysilane.

6. A process as claimed in claim 4 wherein the surface to be coated is of wood.

* * * * *